United States Patent [19]

Yamazaki et al.

[11] 3,974,494

[45] Aug. 10, 1976

[54] CHARACTER DISPLAY APPARATUS FOR PROVIDING A VIEWING FRAME FOR A DATA INPUT AREA

[75] Inventors: Eizo Yamazaki; Osamu Watanabe, both of Kamakura, Japan

[73] Assignee: Mitsubishi Denki Kabushiki Kaisha, Tokyo, Japan

[22] Filed: Jan. 16, 1975

[21] Appl. No.: 541,599

[52] U.S. Cl. .......................... 340/324 AD; 340/154

[51] Int. Cl.² .......................................... G06F 3/14

[58] Field of Search ......... 340/324 A, 324 AD, 152, 340/154; 178/30

[56] References Cited

UNITED STATES PATENTS

| | | | |
|---|---|---|---|
| 2,595,646 | 5/1952 | Doba, Jr. et al. | 340/324 AD |
| 3,466,645 | 9/1969 | Granberg et al. | 340/324 A |
| 3,648,272 | 3/1972 | Schroder et al. | 340/324 A |

*Primary Examiner*—Marshall M. Curtis
*Attorney, Agent, or Firm*—Oblon, Fisher, Spivak, McClelland & Maier

[57] ABSTRACT

A character display apparatus for displaying a character pattern on a display panel includes circuitry for providing a viewing frame of rectangular shape to point out a data input area.

1 Claim, 4 Drawing Figures

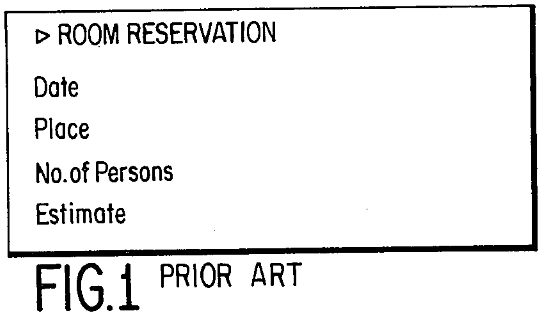
FIG.1 PRIOR ART
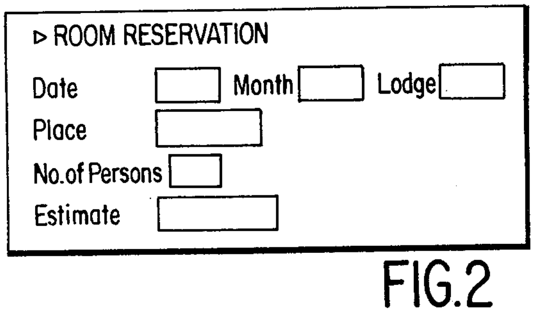
FIG.2
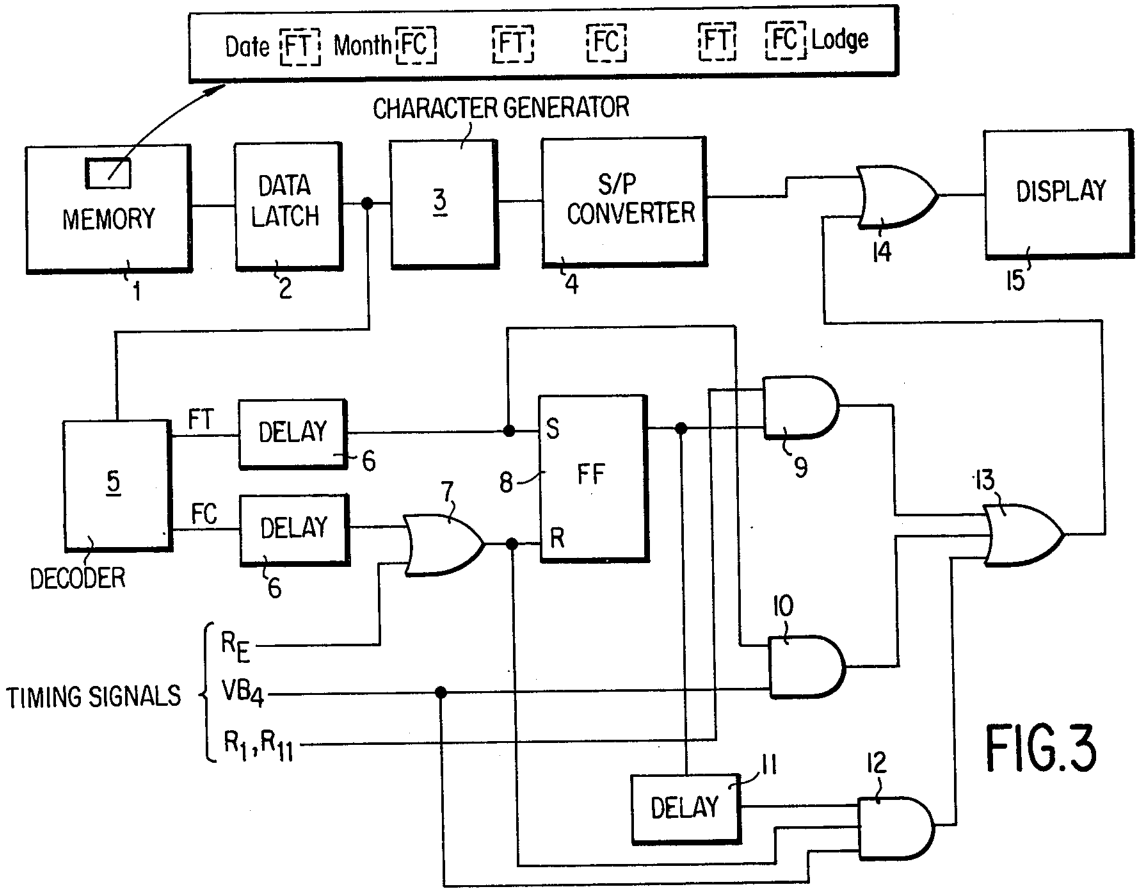
FIG.3
FIG.4
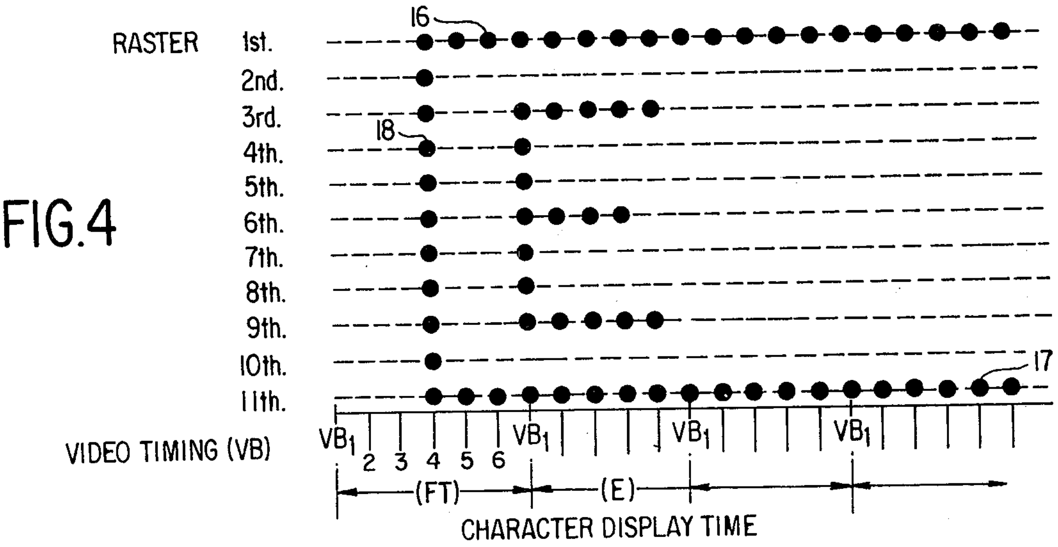

CHARACTER DISPLAY APPARATUS FOR PROVIDING A VIEWING FRAME FOR A DATA INPUT AREA

BACKGROUND OF THE INVENTION

1. Field of the Invention

The present invention relates to a character display apparatus wherein a data input area is displayed by vertical and horizontal ruled lines on a display panel in a rectangular shape so as to provide a viewing frame for the operator of the display apparatus.

2. Description of the Prior Art

Because of the high development of technology for a character display apparatus, the number of displayed characters on a panel has increased from 500 to 1000 to 2000. Accordingly, there are many instances in which it is hard to read the display of various tables or the data entry area. In accordance with the conventional display method, characters are displayed as shown in FIG. 1 and the data input area is not shown.

In the display panel of the display apparatus, one item begins from a character code (special undisplayed code) FT and finishes at a character code FC or the last line, wherein FT designates Field with Tab and FC designates Field code.

Accordingly, a cursor is run at the display position for inserting data of a month by pushing a TAB key to insert the month data and is run at the display position for inserting data of a date by pushing the TAB key to insert the date data.

SUMMARY OF THE INVENTION

An object of the present invention is to provide a display apparatus wherein the data input area is provided with ruled lines so as to provide a viewing frame for the operator.

The foregoing and other objects are attained in accordance with one aspect of the present invention, through the provision of a character display apparatus for displaying a character pattern on a display panel comprising means for displaying a data input area on the panel by a vertical and a horizontal ruled line.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a schematic view of a display picture given by the conventional apparatus;

FIG. 2 is a schematic view of a display picture given by the display apparatus according to the invention;

FIG. 3 is a block diagram of one embodiment for the generation of a ruled line according to the invention; and FIG. 4 is a chart showing the relation of a scanning line and a ruled line at the display part.

DETAILED DESCRIPTION OF A PREFERRED EMBODIMENT

Referring now to the drawings, wherein like reference numerals designate identical or corresponding parts throughout the several views, and more particularly to FIGS. 3 and 4 thereof, in the present invention, the vertical ruled line is displayed by the code FT to find the FC code in the right side of the display panel and the horizontal ruled lines are displayed above and below the displayed characters until the end of the horizontal row. The horizontal ruled lines are stopped at the FC code or at the end of the horizontal row and the vertical ruled line is displayed to close the horizontal ruled lines.

The operation of the apparatus of the invention will be illustrated referring to FIGS. 3 and 4. The character display apparatus which is a raster scanning dots pattern (7 × 7 dots) type will be illustrated. A display text input is recorded through a computer or a key-board in a fresh memory 1 by an operation the same as that of the conventional apparatus. Accordingly, it is recorded as the character code column of [date "FT"] for the text of FIG. 2. In order to display the character code column on a display panel, a dot pattern for the display pattern is realized by transmitting the signal through the character generating device 3 after the data latch 2 for potentially maintaining the data and converting the parallel signal to the series signal by a S/P converter 4 depending upon the raster scanning timing and transmitting it to the display part 15 as a video signal. In the system of the invention, in order to display the ruled line, FT and FC are detected by a decoder 5 for detecting the codes FT and FC, a flip-flop 8 is set by a FT signal passed through a delay element 6 for time delay caused by the display and the flip-flop 8 is reset by a FC signal.

An OR gate 7 is to reset the flip-flop 8 by the raster end signal RE indicating the end of the horizontal row beside the FC signal. An AND gate 9 is to display the horizontal ruled lines from the generation of the FT signal to the detection of the FC signal.

In FIG. 4, the raster signals $R_1$ and $R_{11}$ are transmitted to the gate 9 so as to display the horizontal lines 16 and 17 in the first raster and the 11th raster. The vertical ruled line 18 can be displayed at the time of generation of the FT signal (generating for one character) by applying the signal for each character video timing $VB_4$ shown in FIG. 4 (signal for showing center of character) to an AND gate 10 as the ruled line can be displayed at the center when the character is displayed by 7 × 6 dots.

In order to display the vertical ruled line at the time of stop of the ruled line (not shown), the FC signal or the raster end signal RE is transmitted from the OR gate 7 for indicating the code FC for commanding the stop or the raster end. The FC signal or the raster end signal RE and the $VB_4$ signal are applied to the AND gate 12. On the other hand, in the vertical ruled line displaying condition for indicating the end of the ruled line, it is necessary to display the vertical ruled line until the indication. Accordingly, the period of the FT signal of the flip-flop 8 is controlled through the delay element 11 and the signal is used as the condition setting signal for the operation of the AND gate 12. The horizontal ruled line signal and the vertical ruled line signal are transmitted to the OR gate 13 and are mixed with the conventional video signal in the OR gate 14 and are displayed on the display panel 15.

In accordance with the operation, the ruled line display as shown in FIG. 2 can be easily shown on the display panel by the special character codes FT and FC. Of course, the ruled line is not always necessary. In such a case, the display of the ruled line can be eliminated by a structure using a switch.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent is:

1. A character display apparatus for providing a viewing frame for a data input area comprising:
- a memory element for storing textual material,
- a data latch element,
- a character generator,
- a parallel to series converter,
- a decoder,
- a first delay element,
- a second delay element,
- a first OR gate,
- a flip flop,
- a first AND gate,
- a second AND gate,
- a third delay element,
- a third AND gate,
- a second OR gate,
- a third OR gate,
- a display panel for displaying the textual material and input data and for displaying a viewing frame about the input data,
- means connecting the output of the memory element to the input of the data latch element,
- means connecting the output of the data latch element to the input of the decoder and to the input of the character generator,
- means connecting the output of the character generator to the input of the parallel to series signal converter,
- means connecting the output of the parallel to series signal converter to a first input of the third OR gate,
- means connecting the output of the third OR gate to the input of the display panel,
- means connecting a first output of the decoder to the input of the first delay element,
- means connecting a second output of the decoder to the input of the second delay element,
- means connecting the output of the first delay element to a S input of the flip flop and to a first input of the second AND gate,
- means connecting the output of the second delay element to a first input of the first OR gate,
- means connecting a line for receiving a raster end signal to a second input of the first OR gate,
- means connecting a line for receiving a character video timing signal to a second input of the second AND gate and to a third input of the third AND gate,
- means connecting a line for receiving raster signals to a first input of the first AND gate,
- means connecting the output of the first OR gate to a second input of the third AND gate and to a R input of the flip flop,
- means connecting the output of the flip flop to the input of the third delay element and to a second input of the first AND gate,
- means connecting the output of the third delay element to a first input of the third AND gate,
- means connecting the output of the first AND gate to a first input of the second OR gate,
- means connecting the output of the second AND gate to a second input of the second OR gate,
- means connecting the output of the third AND gate to a third input of the the second OR gate, and
- means connecting the output of the second OR gate to a second input of the third OR gate.

* * * * *